3,133,179
SEMI-AUTOMATIC LOCATING, AUTOMATIC CENTERING INDUCTION HEATING APPARATUS
Robert G. Armstrong, Euclid, and John R. Laughlin, Brecksville, Ohio, assignors to The Ohio Crankshaft Company, Cleveland, Ohio, a corporation of Ohio
Filed Sept. 7, 1961, Ser. No. 136,645
8 Claims. (Cl. 219—10.69)

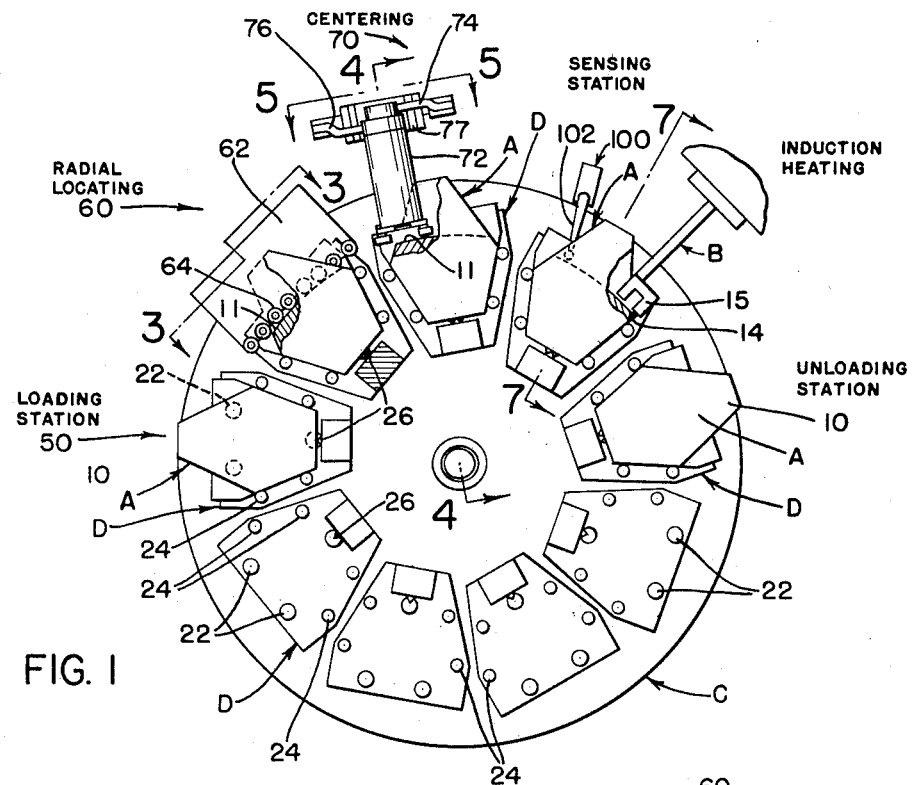
FIG. 1
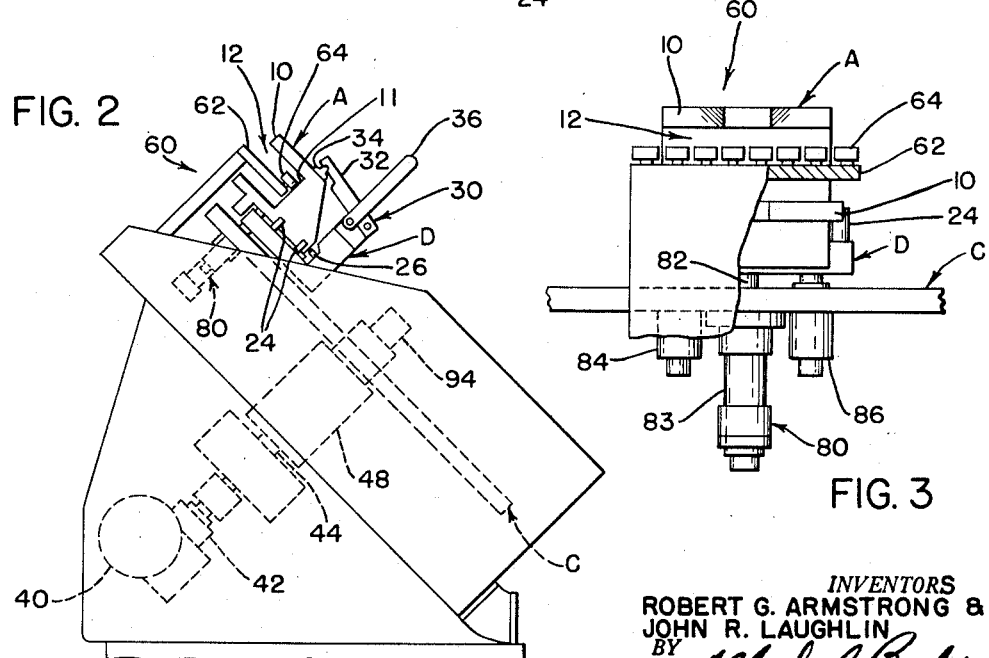
FIG. 2
FIG. 3
INVENTORS
ROBERT G. ARMSTRONG &
JOHN R. LAUGHLIN
BY
Alfred C Body
ATTORNEY May 12, 1964    R. G. ARMSTRONG ETAL    3,133,179
SEMI-AUTOMATIC LOCATING, AUTOMATIC CENTERING
INDUCTION HEATING APPARATUS
Filed Sept. 7, 1961    2 Sheets-Sheet 2
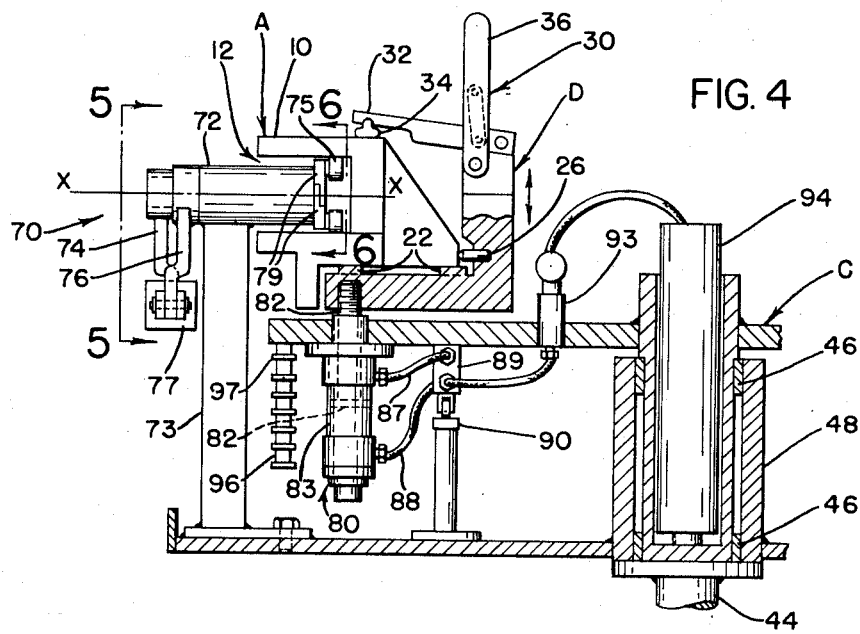
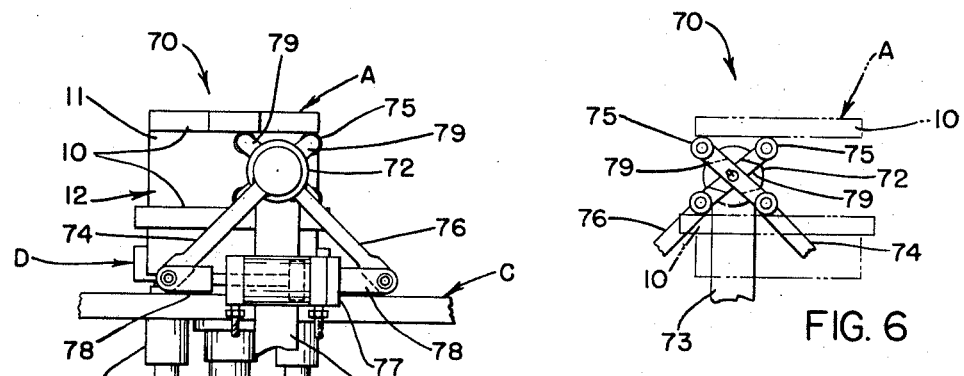
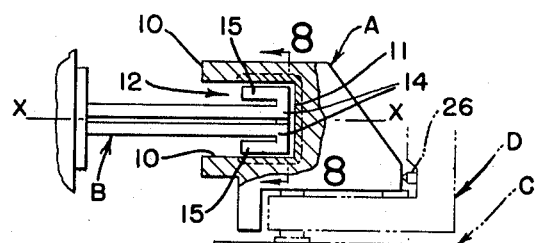
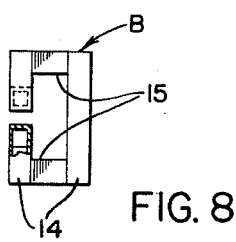
INVENTORS
ROBERT G. ARMSTRONG &
JOHN R. LAUGHLIN
BY
ATTORNEY United States Patent Office 3,133,179
Patented May 12, 1964

This invention pertains to the art of induction heating and more particularly to the method and apparatus of progressively heating by induction and quenching to harden a selected area of an unfinished casting having a general U-channel shape configuration.

The invention is particularly applicable to the induction hardening of spring hangers and will be described with particular reference thereto, although it will be appreciated that the invention has broader applications.

Spring hangers are guide and support brackets for springs of trucks; their shape is essentially a compound curve of a U-channel member with attaching provisions to the frame of the truck. The inner channel surfaces consisting of the bottom of the U-channel and the inside opposed surfaces of the sides require hardening for better wear resistance. This presents a considerable problem because the spring hangers are cast which leaves a rough surface and the casting tolerance adds to the total variation to be handled. It is necessary in induction heating practice to maintain a uniform air gap between the inductor and the part; otherwise, if this is not done, matching problems arise and inconsistent results are obtained in the hardness pattern.

Past practice has, therefore, required that rough parts be pre-machined so that they can be automatically located relative to an inductor to maintain an even air gap or clearance. This, therefore, has added to the machining cost as a prerequisite to induction hardening of the parts, and in some cases has caused the part or product to be surface finished beyond the actual requirements of the use of the part. Another approach in the past has been to individually locate parts for processing by manual means or using special fixturing devices which compensate for size variations. This also adds to the cost of manufacturing an article by the labor involved and purchasing of the special fixturing device. This has slowed production and increased manpower needs.

Still another difficulty has been in obtaining equipment to handle rough parts and properly present them to the induction heating apparatus for induction hardening.

Still another difficulty has been the design of equipment which would automatically center the rough parts for presentment to the inductor and thereby allow for even matching on the opposed sides.

And still another difficulty has been in obtaining equipment to properly locate a third face at a fixed plane so that the coupling of this face to the inductor is within tolerance and no special intermediate fixturing is required.

The present invention contemplates an apparatus which overcomes all of the above referred to difficulties and which is easy to operate and produces consistent results.

In accordance with the present invention, apparatus is provided for induction heating the inside of open channels, including a high frequency inductor and a table movable along a fixed path past the inductor, the table supporting a plurality of fixtures, each fixture having means for locking a channel in a position adjustable in a direction transverse to the plane of its base. This position of the channel in the fixture establishes a distance from the channel base to the inductor. Each fixture is supported for movement on a line transverse to the plane of the sides of the channel and means are provided for simultaneously contacting both sides of the channel and adjusting the position of the fixture in its movable direction until both sides of the channel are spaced an equal distance from the sides of the inductor. A means for locking the fixture in such adjusted position is provided to secure the fixture in this position.

The principal object of the invention is the provision of a new and improved apparatus for the induction heating of the insides of channels which enables the quick and accurate location of a channel member relative to the surfaces of an inductor adapted to fit into the channel and heat the inside of the channel.

Another object of the invention is the provision of a new and improved apparatus for induction heat treating articles of manufacture in a uniform manner even though different pieces may have slightly different external dimensions.

Another object of the invention is the provision of a new and improved apparatus for induction heat treating of cast iron channel members which will accurately locate such members relative to a high frequency inductor without the need for pre-machining of the cast iron members and without need for accurate tolerances on such members.

The invention may take physical form in certain parts and arrangements of parts, the preferred embodiment of which will be described in detail in this specification and illustrated in the accompanying drawings which form a part hereof and wherein:

FIG. 1 is a top elevational view of the novel automatic centering induction heating apparatus;

FIG. 2 is a side elevational view of the radially locating station of the novel apparatus;

FIG. 3 is a partial cross sectional view along line 3—3 of FIG. 1;

FIG. 4 is a partial cross sectional view along line 4—4 of FIG. 1;

FIG. 5 is a partial sectional view along line 5—5 of FIGS. 1 and 4;

FIG. 6 is a partial view along line 6—6 of FIG. 4;

FIG. 7 is a partial cross sectional view along line 7—7 of FIG. 1; and,

FIG. 8 is a partial view along line 8—8 of FIG. 4.

Referring now to the drawings wherein the showings are for the purposes of illustrating a preferred embodiment of the invention only and not for the purposes of limiting same, the figures show induction heat treating apparatus for heat treating a plurality of channel-shaped workpieces A, such apparatus including a high frequency inductor B, a rotatable table C movable on a fixed path past such inductor and adjustably supporting a plurality of fixtures D, each having means for clamping a workpiece A thereto.

The workpiece A may take any one of a number of different forms, but in the embodiment shown, they are generally in the shape of a channel having a pair of legs 10 and a base 11 forming an open ended channel-shaped opening 12, the surfaces of which must be heated to the quench hardening temperature by the inductor B.

The channel of the workpiece A may face in any desired direction as it is heat treated, but in the embodiment of the invention shown, the channel faces horizontally outwardly from the center of the rotation of the table C and the inductor B is mounted externally of the table C and has base heating portions 14 facing radially inwardly and side heating portions 15 facing in axially opposite directions. (FIGS. 7—8.)

As the table rotates, it moves the workpieces A past the inductor B on a fixed path of movement such that the inductor B will pass through the channel opening 12.

The principal problem in apparatus of this type is to have equal spacing between each side of the channel and the corresponding side of the inductor and a uniform spacing between the bottom of the inductor and the bottom of the base 11 from one channel member to the next.

Thus in accordance with the present invention, the fixture D is arranged to lock a workpiece A thereon in any position adjustable in a direction transverse to the plane of its base. Such means may take any one of a number of different forms, but in the embodiment shown, the fixture D has a generally flat base which is provided with three triangularly arranged locator bosses 22 that receive the workpiece A and support the workpiece on the fixture D. The transverse movement of the workpiece is restrained by a number of locator pins 24 which are aligned with respect to each other to provide transverse locating points for the workpiece A on the fixture D. The amount of radial inward movement of the workpiece with respect to the fixture is determined by a stop pin 26 mounted in an upstanding rear portion of the fixture D. This upstanding portion of the fixture also supports a manually actuated over-center clamp 30 shown in FIGS. 2 and 4. A lever arm 32 pivotally mounted to the upstanding portion of the fixture carries a clamp head 34 that is adapted to contact the upper portion of the workpiece A to clamp the workpiece within the fixture as the handle 36 is pivoted toward the workpiece.

The fixtures D are evenly spaced on the upper surface of rotatable table C so they are loaded by moving the workpieces radially inwardly. The table is driven by a shaft 44 from gear reducer 42. The gear reducer in turn is driven by the suitable motor means 40 to operate the apparatus. The workpiece is positioned on the fixture so that the bosses 22 and the locator pins 24 position the workpiece on the base of a fixture opposite the manual loading station 50. The table is then rotated to move the workpiece to a position opposite radial locating device 60. This locating device comprises an inwardly extending plate 62 having a number of locating rollers 64 that contact the base 11 of the workpiece and force the workpiece radially inwardly against stop pin 26 as the fixture passes the plate 62. Thus, the workpiece is located radially and vertically on fixture D. The radial locating device is shown in FIGS. 1–3. After the workpiece is located on the fixture, the clamping handle 36 is moved toward the workpiece to lock the workpiece onto the fixture.

As is disclosed in FIG. 4, the fixture and workpiece clamped thereon form a generally vertically movable assembly with the opening 12 of the workpiece facing radially outwardly. A centering device 70, shown in FIGS. 4–6, comprises a cylinder 72 affixed to the upper portion of a stationary frame member 53 so the cylinder is generally horizontal and has a central axis X—X. Adjacent the rear portion of the cylinder 72, a pair of angularly spaced levers 74 and 76 extend generally downwardly and terminate at a connection with operator links 78 that are operable by a cylinder 77. The upper ends of the levers are joined to actuator sleeves within the cylinder 72 to control pivoting locator arms 79. To provide more accurate location and reduce friction between the locator arms and the sides 10 of the workpiece, the ends of the arms are provided with rollers 75. Movement of levers 74, 76 toward one another causes corresponding movement of arms 79. This movement forces the rollers 75 outwardly with respect to the axis X—X and forces the arms 79 to wedge between the sides 10 of the workpiece. This wedging action forces the workpiece and fixture upwardly or downwardly to center the sides 10 with respect to the axis X—X.

Vertical movement of the fixture by the centering device 70 is possible because the fixture is mounted to have reciprocal movement by providing bushing and guide pins 84, 86 as is shown in FIG. 5. The movement of the fixture reciprocates piston 82 within a fluid filled cylinder 83 of a hydraulic locking device 80. When the fixture is opposite the centering device 70, a cam 90 operates a valve 89 that allows flow of fluid through lines 87, 88 so the piston 82 is freely reciprocated within the cylinder 83. After the workpiece is centered by the device 70, further movement of the table C disengages cam 90 from valve 89. Thus, communication between the opposite sides of the piston 82 is cut off and the piston no longer has free movement with respect to the cylinder 83. In this manner, after the workpiece is centered, the hydraulic locking device 80 locks the workpiece in the position at which it is located by the centering device 70.

To furnish hydraulic fluid to the valve 89, there is provided a hydraulic-pneumatic accumulator 94 which directs fluid through a one-way valve 93 into the valve 89 to assure an adequate amount of fluid within cylinder 83. As is shown, the accumulator is mounted within the journal hub 48 which rotatably supports the table C on bearings 46. It is obvious, that the accumulator, if desirable, may be positioned at various places on the apparatus.

Referring now to FIG. 7, the inductor B having a base portion 14 and side portions 15, is centered on an axis X—X which corresponds to the axis of the centering device 70. As the workpiece is rotated past the inductor, the inductor passes through the opening 12 so that it is a uniform distance from sides 10 and base 11. The radially inward positioning of the workpiece is accomplished by the pin 26 and the vertical positioning of the workpiece is accomplished by centering device 70.

Referring to FIG. 4, a downwardly extending cam assembly 96 is provided with spaced cams 97. These cams contact and actuate a number of electrical switches which control the operation of the centering device 70, the heating cycle of the inductor B, the quenching cycle for the workpiece and various other operations of the apparatus.

In operation, the workpiece A is positioned on the fixture D at the manual loading station 50. Rotation of the table C brings the workpiece into engagement with the radial locating device 60 which contacts base 11 of the workpiece and forces the workpiece radially inwardly to locate the base with respect to the fixture for subsequent heating. At this position the workpiece is clamped onto the fixture by rotation of the clamping handle 36 of clamping device 30. Further rotation of table C brings the workpiece into engagement with centering device 70 which is actuated by a switch controlled in response to a cam 97 on cam assembly 96. Actuation of the centering device 70 positions the sides 10 of the workpiece with respect to an axis X—X by moving the workpiece in an upwardly or a downwardly direction. After the workpiece has been properly centered with respect to the axis X—X, the cam 90 closes valve 89 so the piston 82 is locked with respect to the cylinder 83. Thus, the workpiece is positioned with respect to the table C. Further movement of the table C passes the inductor B through the workpiece and the inductor is energized to heat the inner surfaces of the workpiece. Thereafter, the workpiece is quenched and removed from the table C by unclamping the workpiece from the fixture. It is also possible to quench the workpiece after it is removed from the table.

In FIG. 1, a sensing station 100 having a sensing arm 102 is positioned before the inductor B to assure that the workpiece is aligned with the inductor. If the workpiece is accidentally misaligned, the sensing station 100 stops the apparatus to allow correction of the difficulty.

Although the invention has been described in a particular structural embodiment, it is realized that various modifications and changes may be made in the structure without departing from the scope of the invention. For instance, the locking device 80 may assume various structural embodiments although the hydraulic structure disclosed is preferred and the table C may rotate about a vertical or oblique axis.

Having thus described our invention, we claim:

1. An apparatus for heating the two sides and the base of a channel-shaped workpiece comprising a conveying device for supporting a workpiece fixture and for transferring said fixture past an induction heating device having a central axis and a shape to fit within said channel, said fixture having generally vertical movement with respect to said conveyor device, said fixture having a locator to position the base of said workpiece with respect to said conveyor, means forcing said workpiece against said locator, means clamping said workpiece in said fixture, a centering device for centering the opposed sides of said workpiece with respect to an axis corresponding to the axis of said induction heating device, said centering device having members that contact said sides, said members moving said workpiece and fixture with respect to said conveying device in a generally vertical direction to center the sides of said workpiece with respect to said axis of said induction heating device, and means for locking said fixture in said centered vertical position.

2. An apparatus as defined in claim 1 wherein said conveying device comprises a rotatable table having a plurality of said fixtures supported on the upper surface thereof.

3. An apparatus as defined in claim 1 wherein said locking means comprises a piston affixed to said fixture, a cylinder affixed to said conveying device, said piston reciprocating in said cylinder and defines an upper and a lower fluid chamber in said cylinder, valve means for allowing displacement of fluid from said upper and said lower chamber and means for closing said valve means to prevent displacement of fluid from said chambers after said fixture is centered.

4. An apparatus as defined in claim 1 wherein said means forcing said workpiece against said locator comprises a plate extending inwardly of said workpiece, said plate having a series of rollers engageable with said base to force said workpiece against said locator to position said base with respect to said conveyor.

5. The apparatus as defined in claim 1 wherein said members contacting said sides comprise two arms pivotally mounted on a common axis, rollers on both ends of each arm, said rollers movable outwardly from said axis on rotation of said arms toward one another, said rollers contacting said sides to position said sides with respect to said common axis, said common axis corresponding to the axis of said induction heating device.

6. The apparatus as defined in claim 5 wherein said arms are pivoted by a pair of levers one joined to each arm, a piston and cylinder between said levers, fluid pressure in said cylinder causing said piston to move into said cylinder whereby said levers are forced together to move said arms together when a workpiece is adjacent said centering device.

7. An apparatus for centering a channel-shaped workpiece with respect to the center axis of an induction heating device, said induction heating device having a shape to fit within said channel, said workpiece having two sides and a base, said apparatus comprising a conveyor for transferring said workpiece past the induction heating device, a plurality of workpiece fixtures supported on said conveyor and having reciprocal movement therewith, said fixtures having a locator adjacent the rear portion thereof, a cam means for forcing said workpiece against said locator to position said base with respect to said conveyor so said base will be close to but not touching said induction heating device as the workpiece passes said induction heating device, means for clamping said workpiece onto said fixture after said workpiece is forced against said locator, a centering means for reciprocating said workpiece and said fixture with respect to said conveyor to locate said sides with respect to the center axis of said induction heating device, and means for locking said workpiece and fixture in said center position.

8. Apparatus for centering the two sides of a channel-shaped workpiece with respect to the axis of an induction heating device, said induction heating device having a shape to fit within said channel, said apparatus comprising a conveyor carrying a fixture, said fixture movable reciprocally mounted with respect to said conveyor, means for clamping said workpiece in said fixture so said sides are generally vertically spaced, a workpiece centering device comprising a center axis and generally vertically movable members, at least one of said members moving upwardly from said axis and at least one of said members moving downwardly from said axis, said upwardly moving member contacting one side of said workpiece, said downwardly moving member contacting the other side of said workpiece, and means to control the movement of each member so all members are the same distance from said axis, and means for locking said workpiece and fixture in position after the members of said centering device have been fully extended to center said workpiece.

References Cited in the file of this patent
UNITED STATES PATENTS
2,697,774    Adler et al. _____ Dec. 21, 1954